United States Patent
Alves De Oliveira et al.

(10) Patent No.: US 9,624,352 B2
(45) Date of Patent: Apr. 18, 2017

(54) ULTRA-FINE AGALMATOLITE PRODUCT AND USE THEREOF IN PAINTS

(71) Applicant: LAMIL ESPECIALIDADES MINERAIS LTDA., Para de Minas-Minas Gerais (BR)

(72) Inventors: Kensley Alves De Oliveira, Par de Minas-Minas Gerais (BR); Antonio Telhado Pereira, Para de Minas-Minas Gerais (BR)

(73) Assignee: LAMIL ESPECIALIDADES MINERAIS LTDA., Para de Minas-Minas Gerais (BR)

( * ) Notice: Subject to any disclaimer, the term of this patent is extended or adjusted under 35 U.S.C. 154(b) by 192 days.

(21) Appl. No.: 14/373,754

(22) PCT Filed: Oct. 5, 2012

(86) PCT No.: PCT/BR2012/000565
§ 371 (c)(1),
(2) Date: Apr. 15, 2015

(87) PCT Pub. No.: WO2014/082146
PCT Pub. Date: Jun. 5, 2014

(65) Prior Publication Data
US 2015/0225533 A1    Aug. 13, 2015

(51) Int. Cl.
| | | |
|---|---|---|
| C09D 1/00 | (2006.01) |
| C08K 3/34 | (2006.01) |
| C09C 1/40 | (2006.01) |
| C09C 3/04 | (2006.01) |
| C09C 1/00 | (2006.01) |
| C08K 3/22 | (2006.01) |
| C09D 7/12 | (2006.01) |

(52) U.S. Cl.
CPC ............... *C08K 3/34* (2013.01); *C08K 3/22* (2013.01); *C09C 1/0081* (2013.01); *C09C 1/0084* (2013.01); *C09C 1/405* (2013.01); *C09C 3/041* (2013.01); *C09D 1/00* (2013.01); *C09D 7/1216* (2013.01); *C01P 2004/51* (2013.01); *C01P 2004/53* (2013.01); *C01P 2004/61* (2013.01); *C01P 2006/19* (2013.01); *C01P 2006/62* (2013.01); *C08K 2003/2241* (2013.01)

(58) Field of Classification Search
CPC .. C09D 1/00; C08K 3/34; C08K 3/346; C09C 1/405
See application file for complete search history.

(56) References Cited

U.S. PATENT DOCUMENTS 6,652,642 B2 * 11/2003 Sare .................. C08K 3/346
106/484

OTHER PUBLICATIONS

Castro, C. D. "Estudo da influencia das propriedades de diferentes cargas mineris no poder de cobertura de um filme de tinta," Thesis on Doctorate, Universidade federal do rio Grande do Sul. 2009.*
Machine translation of Castro, C. D. "Estudo da influencia das propriedades de diferentes cargas mineris no poder de cobertura de um filme de tinta," Thesis on Doctorate, Universidade federal do rio Grande do Sul. 2009.*

* cited by examiner

*Primary Examiner* — Vickey Nerangis
(74) *Attorney, Agent, or Firm* — Lucas & Mercanti, LLP

(57) ABSTRACT

Obtaining a natural or synthetic agalmatolite containing a narrow and controlled particle distribution range, can be obtained by a high-energy million process associated to a high performance aerodynamic particle size analysis, the final use of this product being the paint industry, imparting texture, silky luster, fineness, opacity, wet scrub resistance and whiteness to the paint.

11 Claims, 4 Drawing Sheets

| Architectural | Example 01 | Example 02 | Example 03 | Comparative example |
|---|---|---|---|---|
| Oil absorption (g/100 $g_{oil}$)[1] | 43 | 59 | 36 | 40 |
| Average particle diameter | 5.8 | 3.0 | 4.9 | 11.5 |
| % < 20 μm | 99.8 | 100 | 100 | 86.4 |
| % < 15 μm | 98.4 | 100 | 99.5 | 74.1 |
| % < 10 μm | 85.8 | 99.7 | 92.9 | 52.0 |
| % < 5 μm | 49.2 | 84.7 | 58.3 | 20.4 |
| % < 1 μm | 6.1 | 19.5 | 6.6 | 2.4 |

[1] According to ABNT NBR 10417:1988

FIGURE 05

| | |
|---|---|
| Deionized water | 428 |
| Wetting agent | 3 |
| Non-ionic surfactant | 4 |
| Thickener | 12 |
| Agalmatolite of example 01 | 400 |
| Anti-foaming agent | 2.5 |
| Disperse for 15 minutes and complete | |
| Styrene-acrylic resin | 110 |
| Solvent | 25 |
| Coalescent | 15 |
| Water | 48.5 |
| Mass of solids % | 48 |
| Volume of solids % | 22 |

FIGURE 06

| Paint | Example 1A | Example 2A | Example 3A | Comparative Example-A |
|---|---|---|---|---|
| Whiteness[1] | 79 | 83 | 74 | 79 |
| Yellowness[1] | 3.7 | 2.6 | 4.3 | 4 |
| L[1] | 94.7 | 95.9 | 92.4 | 93 |
| Contrast ratio[1] | 97.9 | 98.9 | 96.0 | 92 |
| Abrasion-resistance[2] | 54 | 150 | 50 | 17 |

[1] According to ASTM-D-2805-11; [2] According to ABNT NBR 15078:2004 and 1494:2003

FIGURE 07

ULTRA-FINE AGALMATOLITE PRODUCT AND USE THEREOF IN PAINTS

CROSS-REFERENCE TO RELATED APPLICATIONS

This application is a U.S. national stage of PCT/BR2012/000565 filed on Oct. 5, 2012 which claims the benefit of priority from Brazilian Patent Application No. PI1106045-0 filed Nov. 4, 2011, the contents of each of which are incorporated herein by reference.

BACKGROUND OF THE INVENTION

This patent of invention pertains to natural or synthetic agalmatolite containing narrow particle distribution range, which can be used as mineral load or titanium dioxide extender, or precipitated calcium carbonate or calcined kaolin in the manufacture of industrial, or architectural, or automotive, or printing or demarcation paints, as well as in the production of plastic, rubber and cellulose. More particularly, the advantage of using natural agalmatolite, whose particle distribution is controlled, is in the end appearance of the paint, maintaining the texture, silky luster, fineness, opacity, wet scrub resistance and whiteness.

Dispersion paints are coating materials, which are used for protection and optical embellishment of civil engineering structures. There are groups interested in protective paints for construction, as well as their performance characteristics.

The desire is to have walls coated with a silky sheen. The objective of the paints is to provide such an appearance. To guarantee that the paints have a minimum sheen, semi-sheen agents should be added to the paints, which very substantially supply the directional reflection of light.

Semi-sheen agents are classified as mineral loads and are characterized by special grain-size properties which contribute to reduce the silky luster of a painted surface. The reduction of the silky luster is caused by the appearance of a micro roughness on a painted surface, in which the dispersed light is increased and the directional reflection is reduced. The semi-sheen agents, widely used for dispersion paints are silicates and carbonates. These can be extracted from natural deposits or produced synthetically. The most common natural products in the application of semi-sheen paints are kaolin, agalmatolite, talc, quartz, dolomite and calcite. For the synthetics, there is zinc oxide, precipitated calcium carbonate and calcined kaolin.

Micro roughness may arise by various manners. In the case of paints, the binding agent creates a surface similar to that of human skin. This is the result of incorporating a quantity of particles coarser than the rest of the components, whereby presenting a rough and homogenous surface. In this sense, the size distribution of the grains of all the solid components promotes this effect. If there is an insufficient quantity of the coarse fraction, there will be an "islands effect", which is characterized as individual grains projected like islands on a smooth, homogenous film. Low sheen grains in the structure in the shiny film can be detected by the naked eye.

U.S. Pat. No. 7,758,688 describes the process of producing calcined kaolin having a well-defined particle distribution, which impacts the optical properties of the paints, improving opacity, whiteness, silkiness, texture and luster control. This product is used as titanium dioxide extender.

In U.S. Pat. No. 7,611,575, the properties of the calcined kaolin for a particle distribution less than 10 µm show an improvement in opacity, whiteness, silkiness, texture and luster control, as well as the use thereof as titanium dioxide extender.

Generally, the particle size distribution has little influence on the optical properties of agalmatolite. The commercially known finer agalmatolite product has an average particle diameter of 12 µm and $d_{98}$ of 35 µm. This particle distribution confers this agalmatolite a whiteness of 77%, yellowness of 4, contrast ratio 92%, $L^*$93 and wet scrub resistance of 17.

SUMMARY OF THE INVENTION

The present invention has superior properties to those found in the state of the art, where these characteristics are not simply by deduction. This fact occurs due to the experience in using pure muscovite in architectural paints, where opacity, whiteness and wet scrub resistance are not so different to commercial agalmatolite. Agalmatolite has been present on the market for over 50 years and thus far no research or development has been carried out to obtain an ultrafine product with optical properties comparable to pigments or extenders. Therefore, the process of reducing particles in a controlled manner, capable of generating optical properties comparable to pigments and extenders in the application of paints, is a step forward in the functional properties of the mineral loads and thus contributes to the substitution of pigments obtained from environmentally-aggressive processes.

BRIEF DESCRIPTION OF THE DRAWINGS

FIG. 5 shows a chart with particle diameters;

FIG. 6 shows ingredients of the formulation; and

FIG. 7 shows the result of the procedure of wet scrub resistance without abrasive paste.

DETAILED DESCRIPTION OF THE INVENTION

Figure 1:
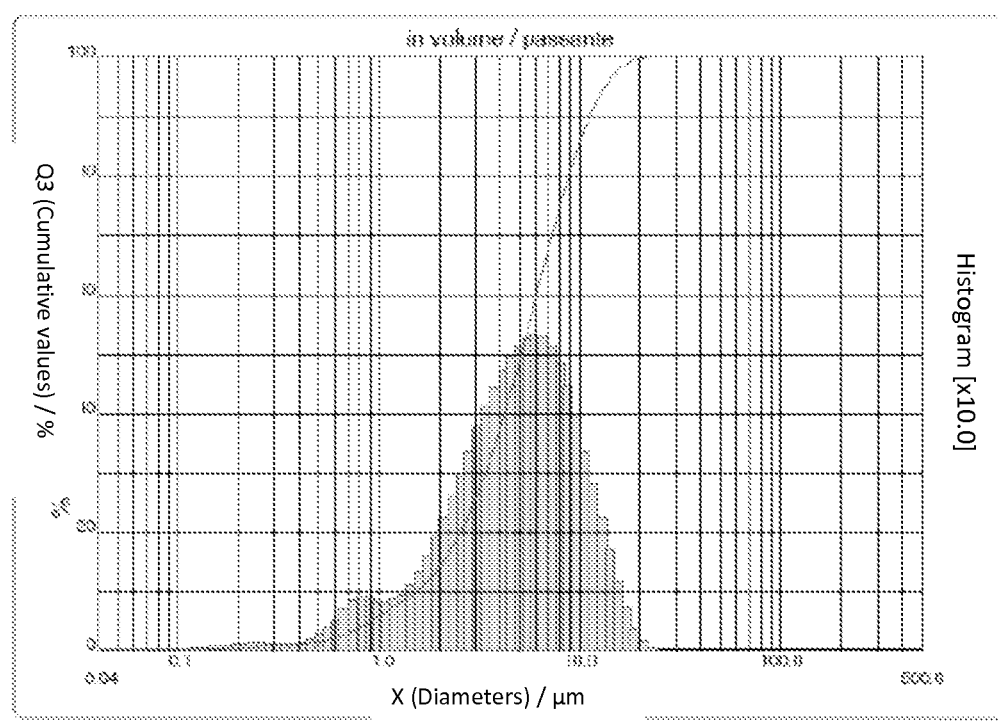
FIG. 1 shows a Cilas 1064 graph of a natural agalmatolite product.

The present invention relates to a natural or synthetic agalmatolite with a controlled particle distribution that incorporates a combination of optical and chemical properties not previously found in simple agalmatolite compositions. More specifically, the agalmatolite of the invention has a unique combination of good characteristics of silky luster and good optical characteristics compared to other agalmatolites available on the market. The product created also works as pigment extender, enabling the partial substitution of pigments such as titanium dioxide without having a substantial loss of opacity or tint strength.

The agalmatolite product of the invention is suitable for use in compositions of industrial, architectural, printing, demarcation and automotive paints, where specific characteristics are desirable. Particularly, the agalmatolite of the invention is suitable for use as a pigment in a paint composition, in which the combination of two or more physical-chemical characteristics are required. The product of the invention may also be used in the production of plastic, rubber, wire, ceramic products, paper and cellulose.

The product of the invention comprises a process of reducing the particles by milling or autogenic impact. The results of this process is the generation of particles with an average diameter of 0.5 μm (micrometers or microns) to 15 μm and a multimodal particle size distribution (PSD). The multimodal PSD, when measured using a LASER diffraction CILAS 1064, will display two different components (or modes) of the distribution: Ultrafine particles, less than 1 μm, generated by the high energy impact inside the process of comminution and fine particles, greater than 1 μm, generated by the impact of energy distributed uniformly under the fed load.

The present invention also provides paint compositions comprising the pigments of the invention. More detailed expositions and examples of these and others aspects of the invention are set forth ahead.

The invention describes a natural or synthetic agalmatolite containing narrow particle distribution range, in which it can be used as mineral load or titanium dioxide extender, or precipitated calcium carbonate or calcined kaolin in the manufacture of industrial, or architectural, or automotive or printing or demarcation paints, as well as in the production of plastic, rubber and cellulose. More particularly, the advantage of using natural agalmatolite, whose particle distribution is controlled, is in the end appearance of the paints, maintaining the texture, silky luster, fineness, opacity and whiteness.

The size of the particles in the present invention was measured using techniques capable of determining the multimodal characteristics of the PSD. The PSD assays were carried out with dispersant $Na_4P_2O_7$ in a CILAS 1064 vat, using MIE calculation method. The optical properties such as whiteness, yellowness and sheen were calculated based on DIN 6167 in the CIE standard using a colorimeter DATA FLASH® 100 of Datacolor International. Contrast ratio (opacity) generally means the power of coverage of paint. Often, the term opacity is employed. According to DIN 53778, part 3, the contrast ratio is about one hundred times the sheen rate and is expressed as a percentage. The contrast ratio was determined by a DATA FLASH® 100 of Datacolor International, with datacolor software, according to ABNT NBR 15314:2005, ABNT NBR 14942:2003, ISO 2814-1973 (E) and ASTM-D-2805-11. The oil absorption was determined as described in ABNT NBR 10417:1988. The wet scrub resistance was performed in accordance with ABNT NBR 15078:2004 and 14940:2003 in an "abrasion tester" by BYK-Gardner USA.

The present invention comprises natural agalmatolite products containing good finishing and opacifying characteristics in a single product. In applying the coating compositions, the products of the invention can show an overall combination of optical and sheen properties, as well as sheen control, based on a simple linear relationship of these properties based on the reduction of the particle size. The products of the invention are obtained by a process of high energy mineral comminution and/or high efficiency classification. The result of this process will be an average particle size of 0.5 μm to 15 μm (micrometers or microns) and a multimodal particle size distribution (PSD). The multimodal PSD was determined using a Cilas 1064 showing two different components (or modes), one different correspondent with ultrafine particles less than 1 μm and the other different component with particles greater than 1 μm.

The fine agalmatolite is obtained by methods known in the state of the art, such as milling in ball mills, or roll mills (Raymonds) or hammer mills. The finest known agalmatolite, distribution described in FIG. 04, has a particle distribution whose $d_{50}$ is in the range of 8-10 μm and the $d_{98}$ is in the range of 35-40 μm. This agalmatolite was obtained by a ball mill in a dry process, with aerodynamic particle size analysis system having a maximum rotation of 1200 rpm. The optical characteristics of this product are matte-effect, low velvety, low wet scrub resistance, but has good whiteness and low yellowness.

In the present invention, the natural agalmatolite containing narrow and controlled particle distribution range, good finishing in the paints, excellent texture, silky luster, fineness, opacity and whiteness, was obtained by the process of high energy comminution, such as: high productivity ceramic ball mills powered at 300 CV, in a dry process coupled to a high efficiency aerodynamic particle size analysis system, with 2000 rpm, operated at high vacuum, at 1000 mmm.c.a, and the end product was collected by a baghouse filter of 550 $g/m^3$. Concomitantly, the natural agalmatolite containing narrow and controlled particle distribution range can be obtained in ceramic opposed jet mill, at a pressure of 7 bar, whose particle classification occurs at 3000 rpm, high vacuum operated, at 1000 mmm.c.a, and the end product was collected in a baghouse filter of 550 $g/m^3$. In combination, the synthetic agalmatolite obtained by way of the process of dehydroxilation by thermal methods, in the temperature range of 500 to 1200° C., preferably 800 to 1200° C., which is milled in higher energy ball mills or opposed jet mill.

The high energy communication processes, opposed jet and thermal treatment to generate products with an average particle diameter of less than 15 μm confer the agalmatolite intrinsic properties, not seen before in this mineral. The effect of reducing the average particle diameter increases the contrast ratio in the paint, as well as the abrasion resistance. This occurs due to the increased surface area, reducing the roughness of the film and occupying the empty spaces. GOLDSCHMIDT et al. Bast Handbook on—basic of coating technology, $2^{nd}$, Vincentz, Hannover, page 165, 2007, describes the densification of the particle size package, reducing the volume of resin used in the paint, impacting on the permeability of the film, as well as the luster and the rheology of the system. GYSAU, Detlef, Fillers for paints, Vincentz, Hannover, page 149, 2006 describes that the smaller particles increase the particle size package in the paint, reducing the empty spaces between the particles. The consumption of resin is reduced and the roughness of the film decreases due to the homogeneity of the surface.

The present invention also provides compositions for paints, comprising the products of the invention. Said compositions of paints may include, besides the pigments of the invention, a polymer agglutinant, a commercial titanium dioxide pigment, optionally, a secondary commercial pigment, such as calcium carbonate and aluminum silicate. For the water-based versions, the paint compositions may use the acrylic resins. The paint compositions of the present invention may also include other conventional additives, including, but not limited to, tensoactives, thickeners, antifoaming agents, wetting agents, dispersants, solvents and coalescing agents.

The examples, tables and drawings that follow demonstrate the properties of this invention.

The following drawings show the profile of particle size reduction and, through the examples, the effects of this reduction in particle size can be ascertained.

FIG. 1 shows a Cilas 1064 graph of the natural agalmatolite product having average diameter ($d_{50}$%) less than 6

μm and $d_{98}$ less than 15 μm, whose histogram presents a multimodal distribution, that is, it is a bimodal distribution in formation, the distribution characteristic of which is slightly narrow Gaussian, after the process of deconvolution of the curves.

Figure 2:
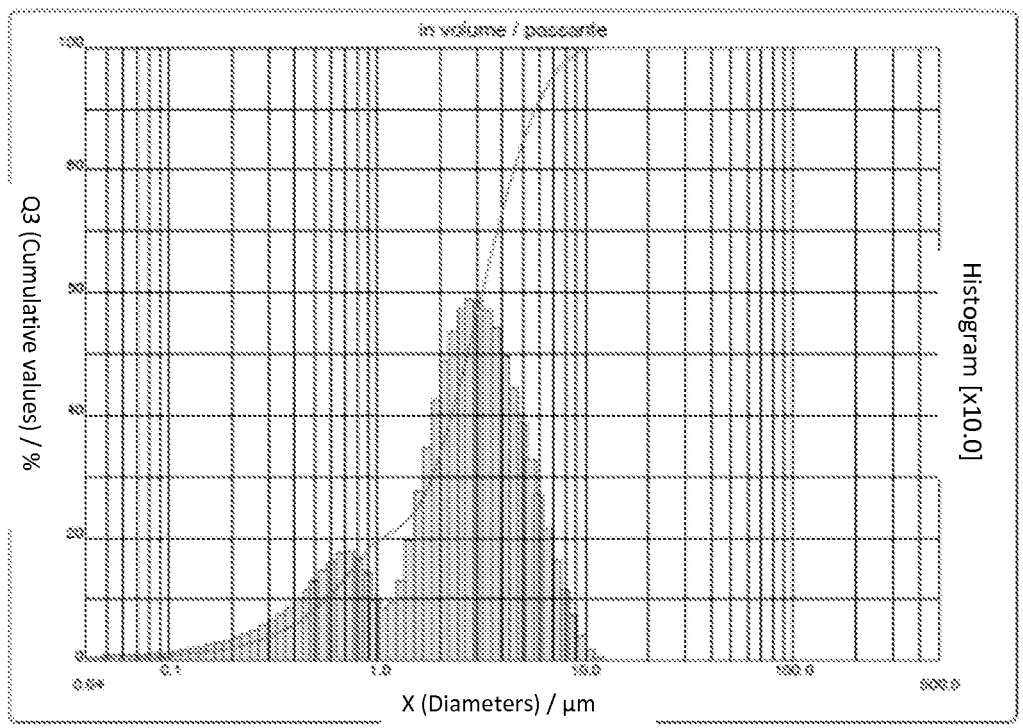
FIG. 2 shows a Cilas 1064 graph of another natural agalmatolite product.

FIG. 2 shows a Cilas 1064 graph of the natural agalmatolite product of average diameter ($d_{50}\%$) less than 4 and $d_{98}$ less than 9 μM, whose histogram presents a multimodal distribution, that is, it is a bimodal distribution in formation, the distribution characteristic of which is slightly narrow Gaussian, after the process of deconvolution of the curves.

Figure 3:
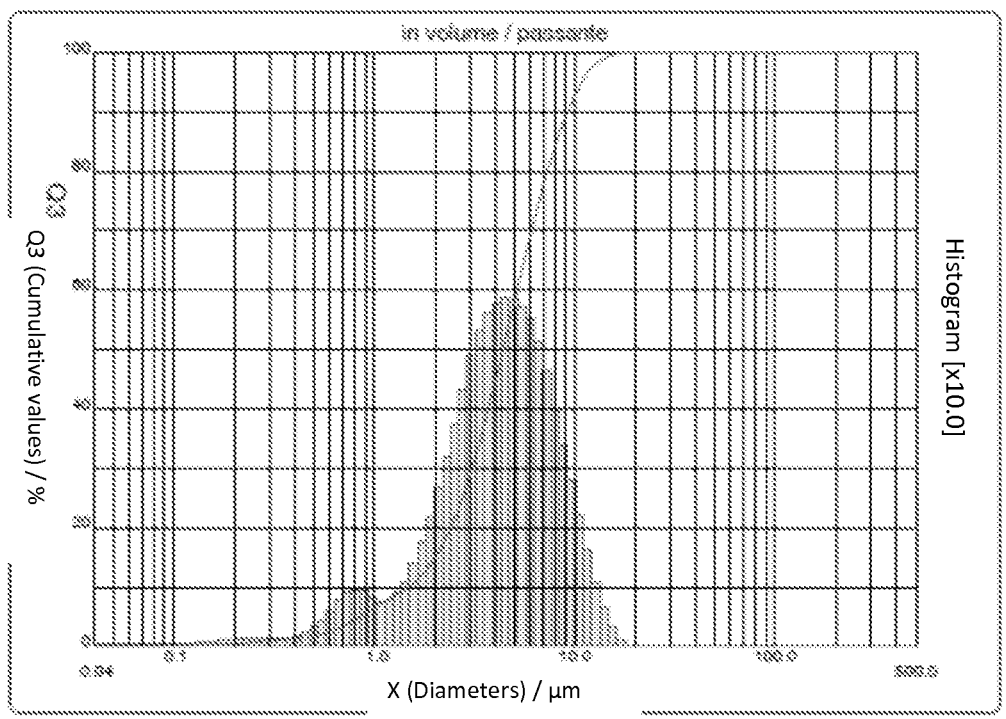
FIG. 3 shows a Cilas 1054 graph of the synthetic agalmatolite product.

FIG. 3 shows a Cilas 1054 graph of the synthetic agalmatolite product of average diameter ($d_{50}\%$) less than 5 μm and $d_{98}$ less than 15 μm, whose histogram presents a multimodal distribution, that is, this is a well-defined bimodal distribution, the distribution characteristic of which is slightly narrow Gaussian, after the process of deconvolution of the curves.

Figure 4:
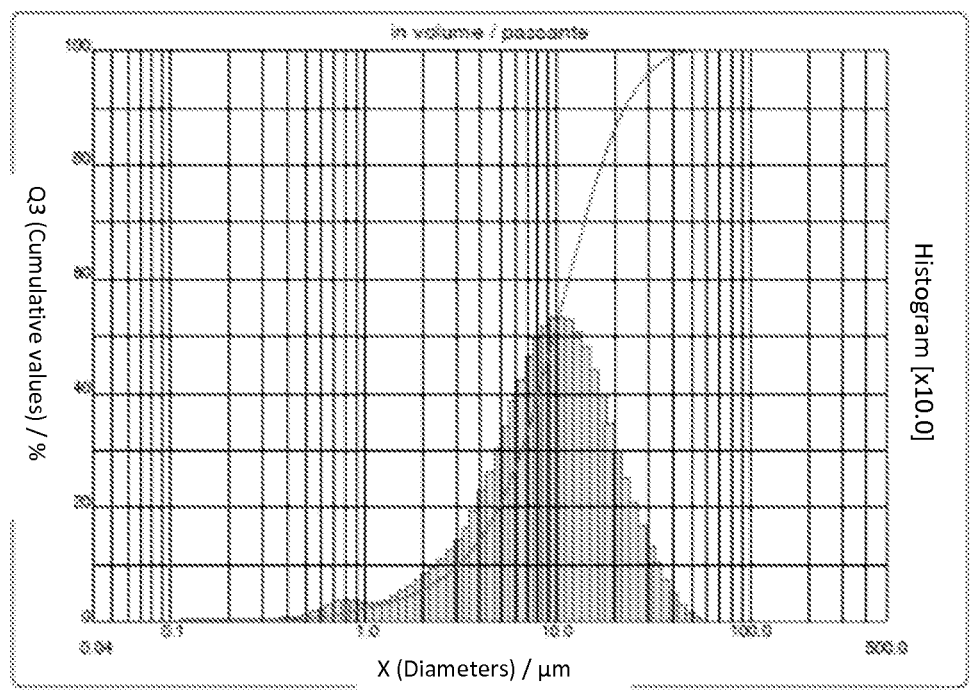
FIG. 4 shows a Cilas 1064 graph of the commercial agalmatolite product.

FIG. 4 shows a Cilas 1064 graph of the commercial agalmatolite product of average diameter ($d_{50}\%$) less than 12 μm and $d_{98}$ less than 35 μm, whose histogram shows a multimodal distribution, that is, it is a bimodal distribution in formation, the distribution characteristic of which is slightly narrow Gaussian, after the process of deconvolution of the curves.

EXAMPLES AND COMPARATIVE EXAMPLE

Example 01

Process of Comminution of the Natural Agalmatolite for a $d_{98}$<15 μm

The natural agalmatolite with particle diameter, $d_{98}$<15 μm, obtained by a process of ceramic ball mills with a productivity of 2 t/h, powered by 300 CV, in a dry process coupled to a high efficiency aerodynamic particle size analysis system, with rotation of 2000 rpm, high vacuum operated, with depression of 1000 mm.c.a, and the end product was collected in a baghouse filter of 550 $g/m^3$ grammature. The PSD was determined by the Cilas 1064, whose cumulative distribution and histogram are shown in FIG. 01 and the particle diameters in table 01 (FIG. 05) (analysis method in accordance with ABNT NBR 10417:1988;

Example 01A

Composition of the Standard Acrylic Paint

The composition of a paint with PVC (Pigment Volume Concentration) of 60% was prepared, using the natural agalmatolite product comminuted in example 01. The formulation comprises ingredients described in table 02 (FIG. 06) in kilograms per 720 liters of paint.

The paint properties, resulting from a film of extended paint, whose thickness is 150 μm, performed by laboratory equipment, according to standard procedures.

Example 01 B

Paint Film

The monocharged paint film of example 01A was carried out using the agalmatolite of example 01. The extension of the paint film, as well as the reading of the optical properties, followed the standards defined in ASTM-D-2805-11. The procedure of wet scrub resistance without abrasive paste was carried out in accordance with ABNT NBR 15078:2004. The results have been summarized in table 03 (FIG. 07) (method analysis in accordance with ASTM-D-2805-11 and ABNT NBR 15078:2004 and 14940:2003).

Example 02

Comminution Process of the Natural Agalmatolite for a $d_{98}$<9 μm

The natural agalmatolite with particle diameter, $d_{98}$<9 μm, obtained by a process of ceramic ball mills with a productivity of 1.3 t/h, powered by 350 CV, in a dry process coupled to a high efficiency aerodynamic particle size analysis system, with rotation of 4000 rpm, high vacuum operated, with depression of 1200 mm.c.a, and the end product was collected in a baghouse filter of 550 $g/m^3$ grammature. The PSD was determined by the Cilas 1064, whose cumulative distribution and histogram are shown in FIG. 02 and the particle diameters in table 01.

Example 02A

Composition of the Standard Acrylic Paint

The composition of a paint with PVC (Pigment Volume Concentration) of 60% was prepared using the natural agalmatolite product comminuted no example 02. The formulation comprises ingredients described in table 04 (FIG. 06) in kilograms per 720 liters of paint.

The paint properties, resulting from a film of extended paint, whose thickness is 150 μm, performed by laboratory equipment, according to standard procedures.

Example 02B

Paint Film

The monocharged paint film of example 02A was carried out using the agalmatolite of example 02. The extension of the paint film, as well as the reading of the optical properties, followed the standards defined in ASTM-D-2805-11. The procedure of wet scrub resistance without abrasive paste was carried out in accordance with ABNT NBR 15078:2004. The results have been summarized in table 03.

Example 03

Process of Comminution of the Natural Agalmatolite Calcined and Comminuted for a $d_{99}$<12 μm The natural agalmatolite calcined with particle diameter $d_{98}$<12 μm, obtained by a process of calcination at 800° C. for 3 hours and ceramic ball mills with a productivity of 1.3 t/h, powered by 350 CV, in a dry process coupled to a high efficiency aerodynamic particle size analysis system, with rotation of 4000 rpm, high vacuum operated, with depression of 1200 mm.c.a, and the end product was collected in a baghouse filter of 550 $g/m^3$ grammature. The PSD was determined by the Cilas 1064, whose cumulative distribution and histogram are shown in FIG. 03 and the particle diameters in table 01 (FIG. 05)

Example 03A

Composition of the Standard Acrylic Paint

The composition of a paint with PVC (Pigment Volume Concentration) of 60% was prepared, using the natural agalmatolite product comminuted in example 03. The formulation comprises ingredients described in table 04 (FIG. 06) in kilograms per 720 liters of paint.

The paint properties, resulting from a film of extended paint, whose thickness is 150 μm, performed by laboratory equipment in accordance with standard procedures.

Example 03B

Paint Film

The monocharged paint film of example 03A was carried out using the agalmatolite of example 03. The extension of the paint film, as well as the reading of the optical properties, followed the standards defined in ASTM-D-2805-11. The procedure of wet scrub resistance without abrasive paste was carried out in accordance with ABNT NBR 15078:2004. The results have been summarized in table 03 (FIG. 07).

Comparative Example

Commercial Agalmatolite Mesh #635 ASTM with 0.6% Retained

The natural agalmatolite with particle diameter $d_{98}$<35 μm, obtained by a conventional milling process and aerodynamic particle size analysis. The PSD was determined by the Cilas 1064, whose cumulative distribution and histogram are shown in FIG. 04 and the particle diameters in table 01 (FIG. 05).

Comparative Example-A

Composition of the Standard Acrylic Paint

The composition of a paint with PVC (Pigment Volume Concentration) of 60% was prepared, using the natural agalmatolite product comminuted in the comparative example. The formulation comprises ingredients described in table 04 (FIG. 06) in kilograms per 720 liters of paint.

The paint properties, resulting from a film of extended paint, whose thickness is 150 μm, performed by laboratory equipment in accordance with standard procedures.

Comparative Example-B

Paint Film

The monocharged paint film of comparative example-A was carried out using the agalmatolite of the comparative example. The extension of the paint film, as well as the reading of the optical properties, followed the standards defined in ASTM-D-2805-11. The procedure of wet scrub resistance without abrasive paste was carried out in accordance with ABNT NBR 15078:2004. The results have been summarized in table 03 (FIG. 07). So, it has been demonstrated that the particle size reduction, within controlled conditions, definitively influences the optical properties and increases the wet scrub resistance. It is noted that these optical properties and wet scrub resistance can only be obtained in the agalmatolite products with 80% of the particles less than 10 μm. However, to obtain this particle size profile, it is necessary to use high energy milling and high performance aerodynamic particle size analysis, to achieve this particle size with productivity of 2 ton/h. Even by low pressure opposed jets, the conventional milling systems.

The invention claimed is:

1. A composition of ultrafine agalmatolite comprising an average particle diameter size in the range of 0.4 to 6 μm and
a multimodal particle size distribution displaying a multimodal particle size distribution, when measured by a laser particle size analyzer, where there are at least two distinguishable components, and at least one of said distinguishable components corresponding to a fine fraction greater than 1 μm and another ultrafine fraction of the different component, whose particle size is less than 1 μm, also in a proportion that results in a flaxseed oil absorption value greater than 45 g of flaxseed oil/100 g of agalmatolite,
wherein
the ultrafine component comprises a range of 15% to 80% by mass, and
the fine component comprises a range of 85% to 20% by mass.

2. The composition of claim 1, wherein 80% by mass of the cumulative distribution of particles has a particle size distribution less than 1 μm and 20% by mass of the cumulative distribution of particles has a particle size distribution greater than 3 μm.

3. The composition of claim 1, wherein 15% by mass of the cumulative distribution of particles has a particle size distribution less than 1 μm and 42% by mass of the cumulative distribution of particles has a particle size distribution greater than 3 μm.

4. The composition of claim 1, wherein 15% by mass of the cumulative distribution of particles has a particle size distribution less than 1 μm and 27% by mass of the cumulative distribution of particles has a particle size distribution greater than 4 μm.

5. The composition of claim 1, wherein the average particle diameter comprises a range of 0.4 to 4 μm.

6. A dry paint film comprising the composition of claim 1, wherein it is produced with 150 μm in thickness, in accordance with ASTM-D-2805-11, a whiteness greater than 79%, opacity greater than 95%, yellowness less than 5 and the wet scrub resistance greater than 50 cycles in a PVA latex or styrene-acrylic monocharged paint, whose PVC is 78%, wherein the solid percentage within this formulation is between 23 and 44% by mass.

7. A dry paint film comprising the composition of claim 1, wherein it is produced with 150 μm in thickness, in accordance with ASTM-D-2805-11, a whiteness is greater than 80%, opacity greater than 96%, yellowness less than 5 and the wet scrub resistance greater than 100 cycles in a PVA latex or styrene-acrylic monocharged paint, whose PVC is 57%, wherein the solid percentage within this formulation is between 27 and 42% by mass.

8. A dried paint film comprising
an agalmatolite pigment based on at least two different components, including an ultrafine component and a fine component, the ultrafine component comprises a range of 15% to 80% by mass, and the fine component comprises a range of 85% to 20% by mass,
wherein,
the fine component is greater than 1 μm and the ultrafine component is less than 1 μm, the fine and ultrafine components are present at a sufficient rate to result in flaxseed oil absorption greater than 45 g of flaxseed oil/100 g of agalmatolite, and an average particle diameter size is in the range of 0.4 to 6 μm,
wherein, the dried paint film displays minimum opacity of 95%, yellowness less than 6, in accordance with ASTM-D-2805-11, and wet scrub resistance greater than 30 cycles, in accordance with ABNT NBR 15078:2004.

9. A semi-sheen paint composition comprising a polymer binder, titanium dioxide and one or more pigment or extenders, wherein the pigment or extender is a gloss-effect agent and/or pigment agent, the agent being natural or calcined comminuted agalmatolite comprising:
- an average particle diameter size in the range of 0.4 to 6 µm and
- a multimodal particle size distribution displaying a multimodal particle size distribution, when measured by a laser particle size analyzer, where there are at least two distinguishable components, and at least one of said distinguishable components corresponding to a fine fraction greater than 1 µm and another ultrafine fraction of the different component, whose particle size is less than 1 µm, also in a proportion that results in a flaxseed oil absorption value greater than 45 g of flaxseed oil/100 g of agalmatolite, wherein the ultrafine component comprises a range of 15% to 80% by mass, and the fine component comprises a range of 85% to 20% by mass.

10. The composition of claim 9, wherein the composition is a water-based composition and the polymer binder is dispersed in water.

11. The composition of claim 9, wherein the composition comprises one or more additives selected from the group consisting of wetting agents, surfactants, anti-foaming agents, thickeners, dispersants and coalescing agents.

* * * * *